United States Patent
Shiraishi et al.

(10) Patent No.: US 6,186,611 B1
(45) Date of Patent: Feb. 13, 2001

(54) GRADATION RECORD CONTROL APPARATUS FOR INK JET PRINTER

(75) Inventors: Tadashi Shiraishi, Kasuga; Masakazu Mizusaki; Shinsuke Sato, both of Fukuoka, all of (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 08/655,569

(22) Filed: May 30, 1996

(30) Foreign Application Priority Data

Aug. 18, 1995 (JP) ................................... 7-210289

(51) Int. Cl.[7] .................................................. B41J 2/205
(52) U.S. Cl. ................................................... 347/15
(58) Field of Search .............................. 347/15, 55, 9, 347/10, 12

(56) References Cited

U.S. PATENT DOCUMENTS

| 3,060,429 | 10/1962 | Winston . | |
|---|---|---|---|
| 3,179,042 | 4/1965 | Naiman . | |
| 3,747,120 | 7/1973 | Stemme . | |
| 4,394,662 | * 7/1983 | Yoshida et al. | 347/15 |
| 4,710,784 | * 12/1987 | Nakayama | 347/15 |
| 5,036,337 | * 7/1991 | Rezanka | 347/14 |
| 5,159,355 | * 10/1992 | Horio et al. | 347/60 |

FOREIGN PATENT DOCUMENTS

| 61-59914 | 12/1961 | (JP) . |
| 61-59911B2 | 5/1979 | (JP) . |
| 61-59914B2 | 2/1980 | (JP) . |
| 62-11035B2 | 8/1985 | (JP) . |
| 61-59911 | 12/1986 | (JP) . |
| 62-11035 | 3/1987 | (JP) . |

* cited by examiner

Primary Examiner—John Barlow
Assistant Examiner—Michael S. Brooke
(74) Attorney, Agent, or Firm—Stevens, Davis, Miller & Mosher, L.L.P.

(57) ABSTRACT

In a graduation record control apparatus, as a power source, a voltage of a sawtooth waveform is generated and used, and a part of this sawtooth waveform voltage is used at different timings to apply different voltages to the electrodes. Thus, a satisfactory gradation recording is carried out by changing the dot sizes.

16 Claims, 5 Drawing Sheets

GRADATION RECORD CONTROL APPARATUS FOR INK JET PRINTER

BACKGROUND OF THE INVENTION

1. Field of the Invention

The present invention relates to a gradation record control apparatus for an ink jet printer which can control the gradation of an image to be recorded.

2. Description of the Related Art

In recent years, ink jet printers have come to be used widely as output printers for domestic and office computers from a viewpoint that the ink jet printers are quiet during a recording period, can achieve a high-speed recording and can easily print in colors. These ink jet printers make the ink to be flown in droplets and carry out a recording by adhering the flown droplets onto a recording sheet. The ink jet printers are broadly classified into a continuous system and an on-demand system according to a method of generating droplets and a method of controlling a flying direction.

The continuous system is a system as disclosed, for example, in U.S. Pat. No. 3,060,429, according to which ink droplets are generated by an electrostatic absorbing, the generated droplets are electrolytically controlled according to a recording signal and the droplets are selectively adhered onto the recording sheet to thereby carry out a recording. This system requires a high voltage for generating droplets and has a difficulty in having a multi-nozzle. Thus, the continuous system is not suitable for a high-speed recording.

The on-demand system is a system as disclosed, for example, in U.S. Pat. No. 3,747,120, according to which an electrical recording signal is added to a piezo-oscillating element which is provided in a recording head having a nozzle aperture for jetting droplets. This electrical recording signal is changed to a mechanical oscillation of the piezo-oscillating element and the droplets are jetted from the nozzle aperture according to the mechanical oscillation and are adhered onto the recording sheet to thereby carry out a recording. Since the ink is jetted from the nozzle aperture on demand to carry out a recording, unlike the continuous system, it is not necessary to recover the droplets which have not been used for recording an image after the ink droplets were flown. Therefore, the on-demand system can take a simpler structure. However, the on-demand system has drawbacks in that it is difficult to process the recording head, that it is difficult to have multi-nozzles because of an extreme difficulty in achieving a compact piezo-oscillating element, and that the system is not suitable for a high-speed recording since the droplets are flown by a mechanical energy which is a mechanical oscillation of the piezo-oscillation element.

Further, as another type on-demand system, there is a recording system for flying liquid drops by boiling the ink with a heat generated by a heat generating resistor, as disclosed in JP-B-61-59911, JP-B-62-11035 and JP-B-61-59914, respectively.

Further, there is still another on-demand system which utilizes a thermal energy, instead of utilizing a mechanical oscillation energy by means of the piezo-oscillation element or the like, as disclosed in U.S. Pat. No. 3,179,042. The system which utilizes a thermal energy has characteristics that the energy conversion efficiency is high and that it is easy to have multi-nozzles, as compared with the system which utilizes the mechanical oscillation energy.

The principle of ink jetting according to the above-described system which utilizes a thermal energy will be explained below. FIG. 7 is a structural diagram for showing a conventional gradation record control apparatus. In FIG. 7, 37 denotes a conductive ink, 38 an ink chamber filled with the conductive ink 37, 39 an ink tank for accommodating the conductive ink 37, and 40 and 41 a pair of electrodes disposed at a lower level than the liquid surface of the conductive ink 37. 42 denotes a power source for applying a voltage to the electrodes 40 and 41, 43 a switch for selectively applying a power to the electrodes 40 and 41, and 44 a nozzle for jetting the conductive ink 37. 45 denotes a recording sheet and 46 denotes an ink drop jetted from the nozzle 44. When a voltage is applied to the electrodes 40 and 41, a current flows to the conductive ink 37, and a part of the conductive ink 37 between the front ends of the electrodes 40 and 41 is vaporized by Joule heat of the current. The steam of the vaporized conductive ink 37 is expanded until a pressure which is sufficient enough to jet the ink drop 46 onto the recording sheet 45 from the nozzle 44 has been generated. By on-and-off control of the switch 43, a nozzle aperture for jetting the conductive ink 37 is selected and a desired character is formed on the recording sheet 45.

However, when the ink jetting device is to be used as a gradation record control apparatus, it is necessary to apply different voltages to the electrodes 40 and 41 in order to change the size of the ink drops 46. For this purpose, it is necessary to have switching elements and power sources for changing over different voltages corresponding to the number of gradations for each nozzle of a plurality of nozzles. For example, in order to change each of 100 nozzles in eight gradations, 800 switching elements and eight power sources are necessary, which has a problem that the cost of circuits becomes extremely high. Further, when a voltage is to be changed over for each scan by assuming that each row is scanned eight times, there is a problem that the printing speed is reduced to one eighth although the circuit scale becomes smaller.

SUMMARY OF THE INVENTION

In order to eliminate the above-described problems of the prior-art techniques, it is an object of the present invention to provide a gradation record control apparatus for an ink jet printer which can achieve a high-speed gradation printing in a small-scale circuit.

In order to achieve the above object, the gradation record control apparatus for the ink jet printer according to the present invention includes a plurality of nozzles for jetting ink, an ink jet energy generating unit, provided for each of the plurality of nozzles, for generating an energy to jet ink of different quantity from the corresponding nozzle according to a voltage value to be inputted, a gradation voltage generating unit for generating a gradation voltage of which voltage value changes at a predetermined cycle, and an output unit for outputting a part of the gradation voltage to the ink jet energy generating unit according to the quantity of the ink jetted. With the above-described structure, it is possible to output different voltages to the ink jet energy generating units and to change the quantity of ink jet from each nozzle, without providing a plurality of voltage sources and a plurality of switching elements.

BRIEF DESCRIPTION OF THE DRAWINGS

FIG. 6 is a timing chart of this invention in which FIG. 6(a) is a timing chart for showing a character print clock CK, FIG. 6(b) is a timing chart for showing a modulation voltage VM, FIG. 6(c) is a timing chart for showing a gradation control signal SM1 in the case of recording a small dot diameter, FIG. 6(d) is a timing chart for showing a gradation control signal SM2 in the case of recording a small-medium dot diameter, FIG. 6(e) is a timing chart for showing a gradation control signal SM3 in the case of recording a medium-large dot diameter, FIG. 6(f) is a timing chart for showing a gradation control signal SM4 in the case of recording a large dot diameter, FIG. 6(g) is a timing chart for showing a pre-heating signal f, FIG. 6(h) is a timing chart for showing an enable signal ENB, FIG. 6(i) is a timing chart for showing a pulse signal i of a driver circuit, FIG. 6(j) is a timing chart for showing a pulse signal j of the driver circuit, FIG. 6(k) is a timing chart for showing a voltage between the electrodes DM, FIG. 6(l) is a timing chart for showing a head drive signal to be outputted from the driver circuit, and FIG. 6(m) is a timing chart for showing a head drive signal to be outputted from the driver circuit.

DESCRIPTION OF THE PREFERRED EMBODIMENT

One embodiment of the present invention will be explained below with reference to the drawings.

Figure 1:
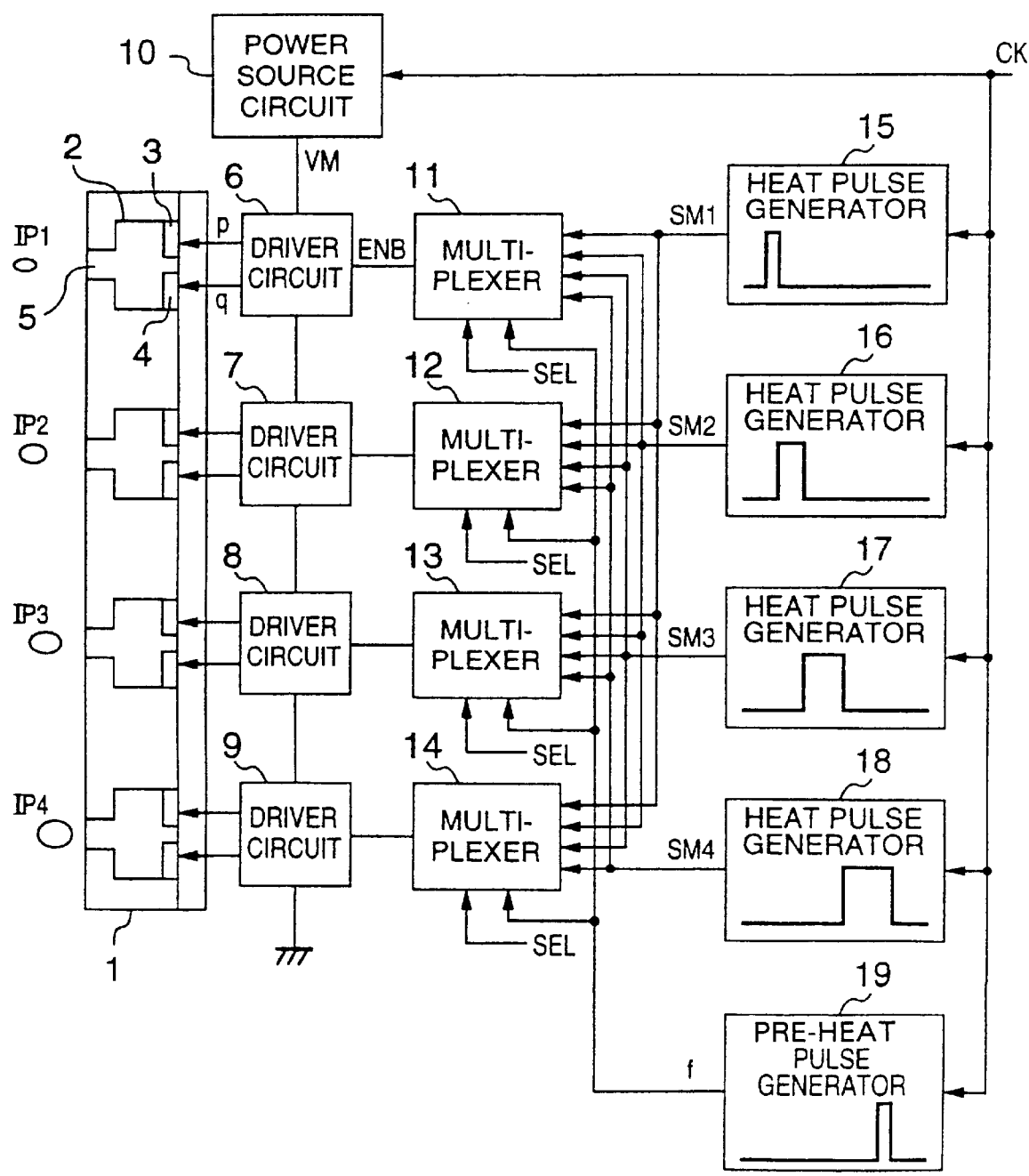
FIG. 1 is a block diagram for showing a gradation record control apparatus for an ink jet printer relating to one embodiment of the present invention.

FIG. 1 is a block diagram for showing the gradation record control apparatus for an ink jet printer relating to one embodiment of the present invention, which shows an example of the gradation record control apparatus having four nozzles. Referring to FIG. 1, 1 denotes a printing head to be controlled by the gradation record control apparatus relating to the present embodiment, 2 an ink chamber filled with a conductive ink, and 3 and 4 a pair of electrodes. 5 denotes a nozzle for jetting the conductive ink, 6 to 9 driver circuits for driving the printing head 1, 10 a power source circuit for generating a modulation voltage VM, 11 to 14 multiplexers (enable signal generators) for generating an enable signal ENB, 15 to 18 heat pulse generators (pulse generators) for generating gradation control signals SM1 to SM4, 19 a pre-heat pulse generator for generating a pre-heating signal f, and IP1 to IP4 ink droplets.

Figure 2:
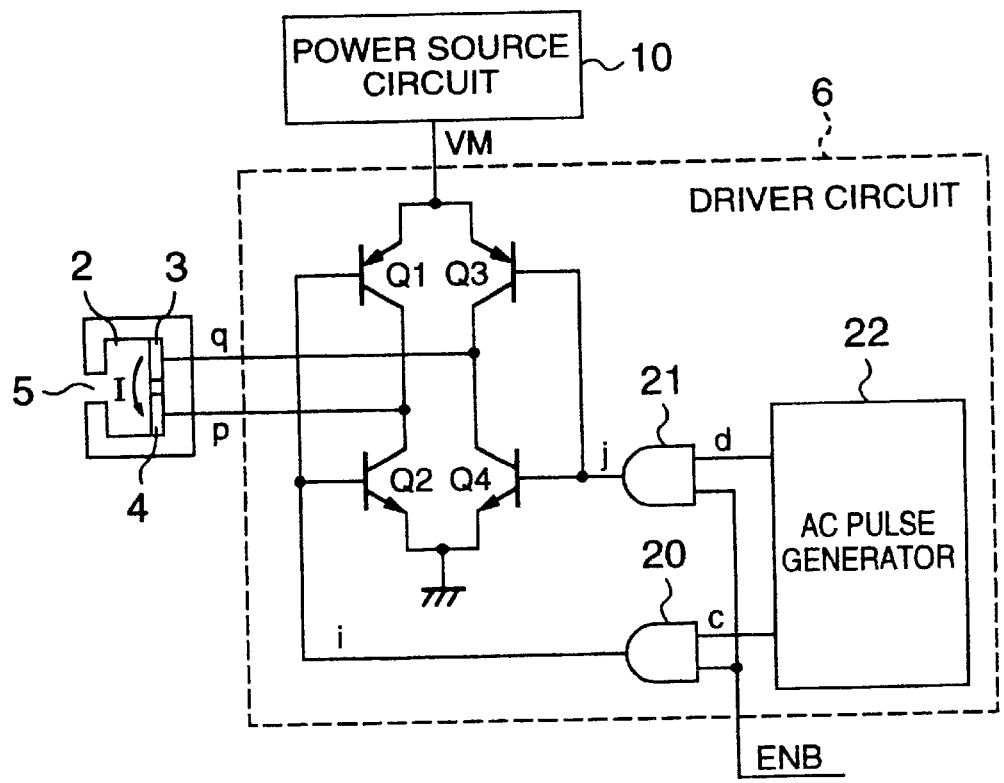
FIG. 2 is a circuit diagram for showing details of a driver circuit which structures the gradation record control apparatus shown in FIG. 1.
Figure 7:
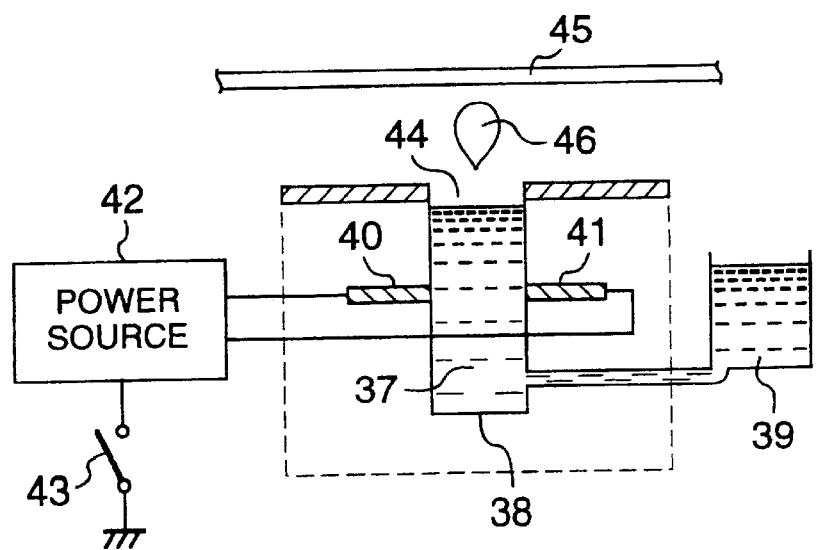
FIG. 7 is a structural diagram for showing the prior-art gradation record control apparatus.

FIG. 2 is a circuit diagram for showing the details of the driver circuits 6 to 9 which structure the gradation record control apparatus shown in FIG. 1. In FIG. 2, Q1 to Q4 denote transistors, 20 and 21 AND circuits, and 22 an AC pulse generator for generating an AC pulse.

Before explaining the operation of the gradation record control apparatus having a structure as described above, the signals, operation, etc. of the driver circuits shown in FIG. 2 will be explained. When a pulse signal i to be inputted to the base of the transistors Q1 and Q2 is at a high level and a pulse signal j to be inputted to the base of the transistors Q3 and Q4 is at a low level, the transistor Q1 is in the off state, Q2 is in the on state, Q3 is in the on state and Q4 is in the off state, so that the output voltage VM of the power source circuit 10 is applied to the electrode 3 and the electrode 4 is set to the ground level. Thus, a current I flows in an arrow direction through the conductive ink. Similarly, when the pulse signal i to be inputted to the base of the transistors Q1 and Q2 is at a low level and the pulse signal j to be inputted to the base of the transistors Q3 and Q4 is at a high level, the transistor Q1 is in the on state, Q2 is in the off state, Q3 is in the off state and Q4 is in the on state, so that the output voltage VM of the power source circuit 10 is applied to the electrode 4 and the electrode 3 is set to the ground level. Thus, the current I flows in a direction opposite to the arrow direction through the conductive ink. As described above, when the conductive ink in the periphery of the electrodes 3 and 4 is to be jetted, the high and low levels of the pulse signals i and j respectively are alternately repeated for a predetermined period and an AC current is flown between the electrodes 3 and 4. With this arrangement, the conductive ink in the periphery of the electrodes 3 and 4 is boiled and the conductive ink is jetted from the nozzle 5 by the pressure of a gas bubble generated by this boiling. The largest merit obtained from the flowing of an AC current between the electrodes 3 and 4 is that an electrolysis of the electrodes 3 and 4 is prevented so that the life of the electrodes 3 and 4 can be made longer as compared with the case of flowing a DC current between the electrodes 3 and 4. Output signals c and d of the AC pulse generator 22 have a frequency of several hundred kHz to several MHz and a duty factor not higher than 50%, with their phases mutually deviated by 180 degrees. The signals c and d are basic pulses for switching the transistors Q1 to Q4. A logical product is taken between the signals c and d and the enable signal ENB by the AND circuits 20 and 21, and the signals c and d become effective when the enable signal ENB is at a high level.

Figure 3:
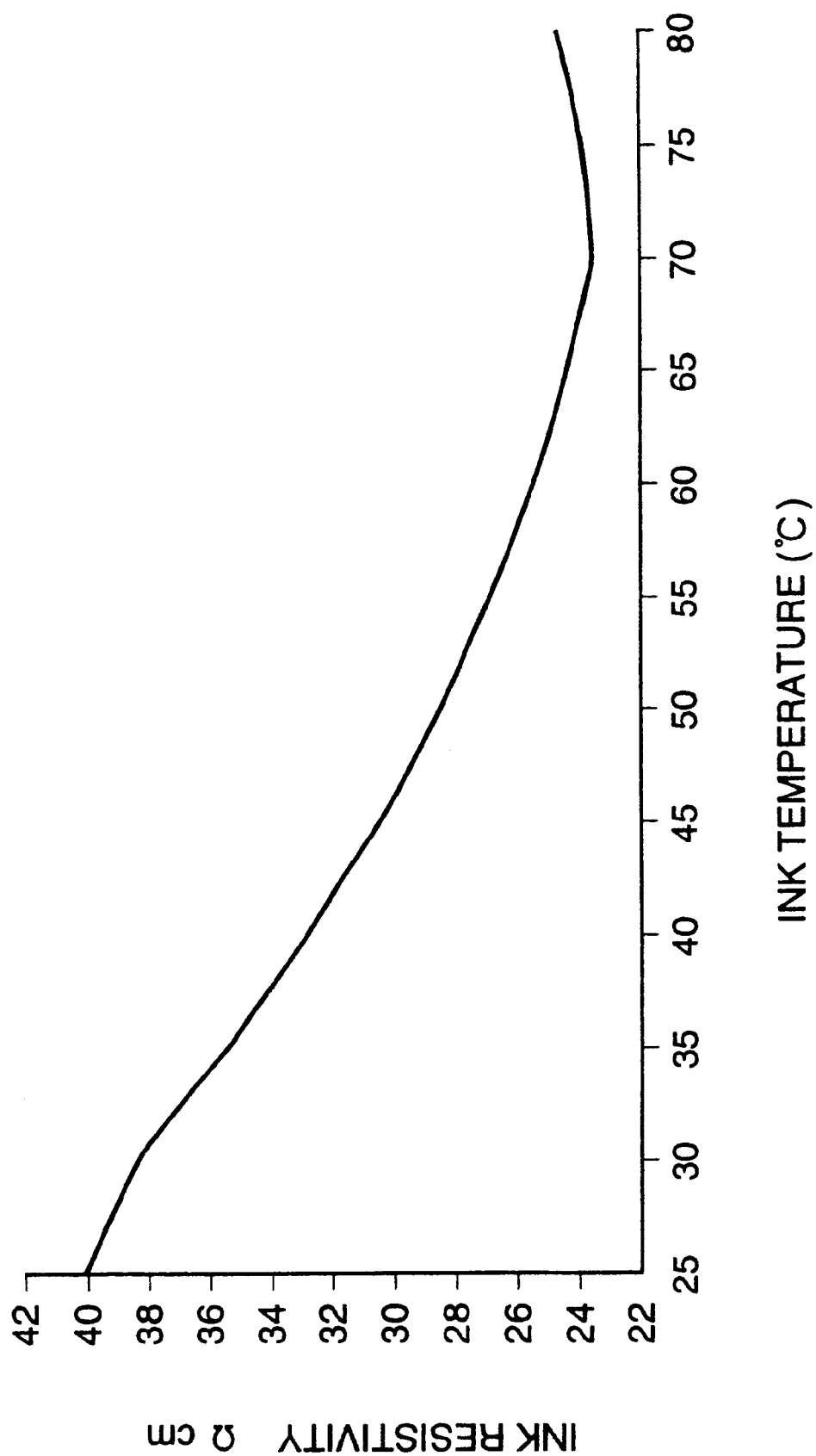
FIG. 3 is a graph for showing resistivity of a conductive ink at different temperatures.
Figure 4:
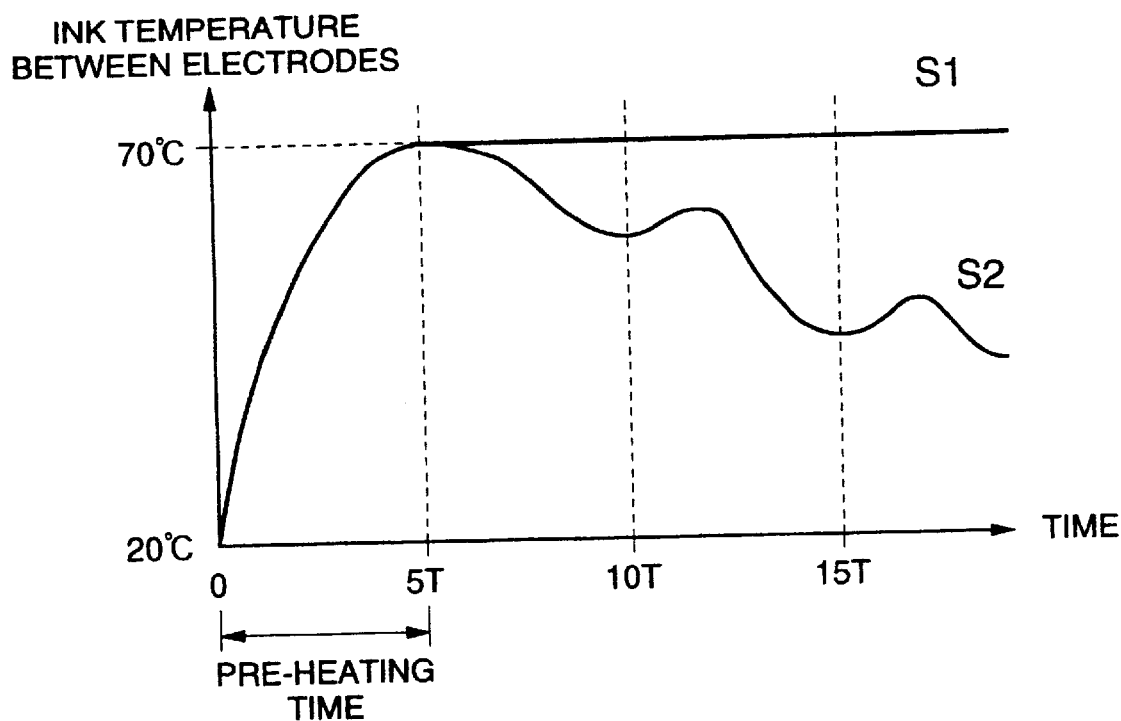
FIG. 4 is a graph for showing temperatures of conductive ink between electrodes.

The pre-heating control in the present embodiment will be explained next. FIG. 3 is a graph for showing resistivity of the conductive ink with respect to temperature. As shown in FIG. 3, the resistivity of the conductive ink is lowered when the temperature of the conductive ink rises. In other words, when the temperature of the conductive ink rises, it becomes easier for a current to flow through the conductive ink. FIG. 4 is a graph for showing the temperature of the conductive ink between the electrodes 3 and 4. As shown in FIG. 4, the conductive ink of which temperature is 20° C. at time 0 is pre-heated to the temperature 70° C. at time 5T. When a continuous printing has started at the time 5T, a thermal equilibrium state is maintained when the following relation is established:

Energy required for a printing/dot/T=P1×t1=energy to be consumed/dot/T, where P1 represents a power per one dot to be applied between the electrodes 3 and 4 during a jet cycle (printing cycle), and t1 represents a current conduction time until the conductive ink is jetted. Under this condition, the temperature of the ink is always maintained at 70° C. as shown by a characteristic line S1.

However, in the case of an intermittent printing, as shown by a characteristic line S2 in FIG. 4, an energy for carrying out a printing is not supplied between the electrodes 3 and 4 during a period of 4T from 5T to 9T, for example, when there is no printing. Under this condition, the temperature of the conductive ink is gradually lowered and it becomes difficult to boil the conductive ink. Further, with an increase in the resistivity along with the reduction in temperature, it becomes more difficult for a current to flow through the conductive ink, with a result that the conductive ink cannot be jetted at time 10T.

In order to prevent such an inconvenience as described above, a pre-heating control is carried out in the present embodiment. In other words, a dummy printing is carried out during a period when the conductive ink is not jetted (an energy is supplied to the conductive ink between the electrodes 3 and 4, but the conductive ink is not actually jetted). A thermal equilibrium state is maintained when the following relation is established:

Energy for maintaining the temperature of the conductive ink/dot/ T=P1×t2=consumed energy/dot/T, where t2 represents a current conduction time for a pre-heating during a period of a jet cycle (printing cycle) T. Under this condition, the temperature of the conductive ink is always maintained at a constant temperature so that a stable jetting can be performed.

In considering an energy to be lost, when the conducive ink is jetted, the loss of energy is larger than when the conductive ink is not jetted by the portion of the conductive ink jetted, and therefore, t2 is considerably shorter than t1.

Further, during a printing period when no energy is supplied between the electrodes 3 and 4 or uring a printing period when the conductive ink is not jetted despite a conductive ink jetting period, a pre-heating is carried out and the temperature of the conductive ink is maintained at a constant temperature.

Figure 5:
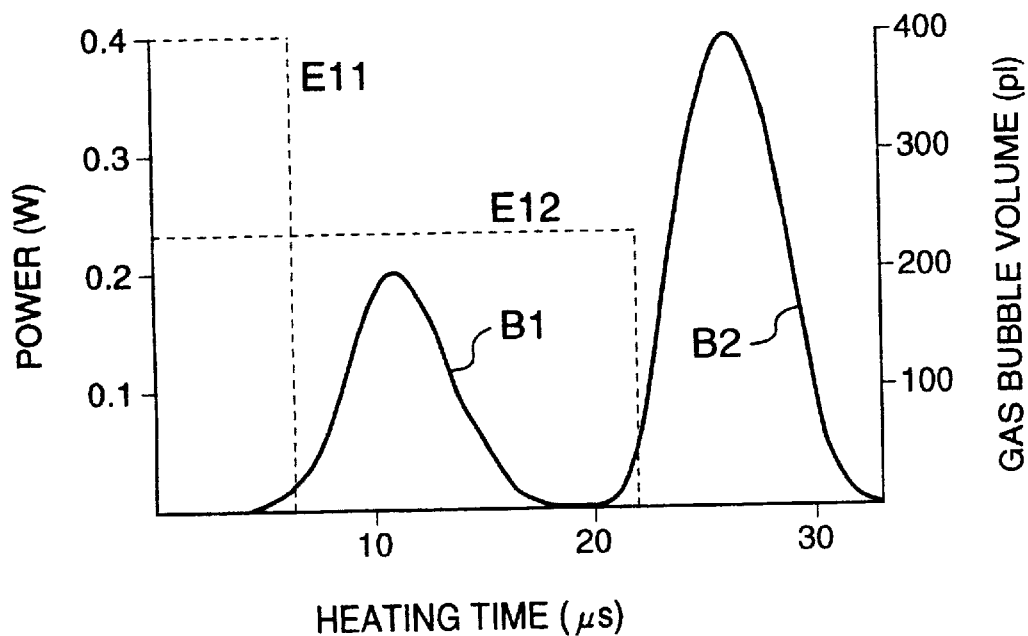
FIG. 5 is a graph for showing the relation between an applied power and a heating time.

The gradation record control in the present embodiment will be explained next. FIG. 5 is a graph for explaining the principle of changing the dot diameter for the gradation record control, and this graph shows the relation between an applied power and a heating time. In FIG. 5, the abscissa shows a heating time and the ordinate shows a gas bubble volume p1 (picoliter) for determining the applied power W and the dot diameter. As shown in FIG. 5, when a power of 0.4 W is applied to the printing head 1, the heating time until the starting of a boiling becomes 7 As and the energy of E11=0.4×7=2.8 $\mu$J (microjoule) is obtained. In this case, the gas bubble grows as shown in B1 and a maximum gas bubble volume becomes 200 pl. Similarly, when a power of 0.23 W is applied to the printing head 1, the heating time until the starting of the boiling becomes 22 $\mu$s and the energy of E12=0.23×22 $\mu$J=5.06 $\mu$J. The gas bubble in this case grows as shown in B2 and a maximum gas bubble volume becomes 400 pl. The time until the starting of the boiling is determined by the applied power as explained above, and the volume of the conductive ink to be heated is changed by the time until the starting of the boiling. When the volume to be heated becomes larger, the volume of a maximum growth gas bubble becomes larger. In other words, when the conductive ink is heated gradually, it becomes possible to form a larger gas bubble. When the heating is started, the current between the electrodes 3 and 4 is interrupted by the gas bubble, so that the maximum growth gas bubble volume is not affected even if it is so controlled that the application of the voltage is stopped immediately after the starting of the boiling. It is possible to carry out the gradation control according to the dot diameter by changing the gas bubble volume in the manner as described above.

Figure 6:
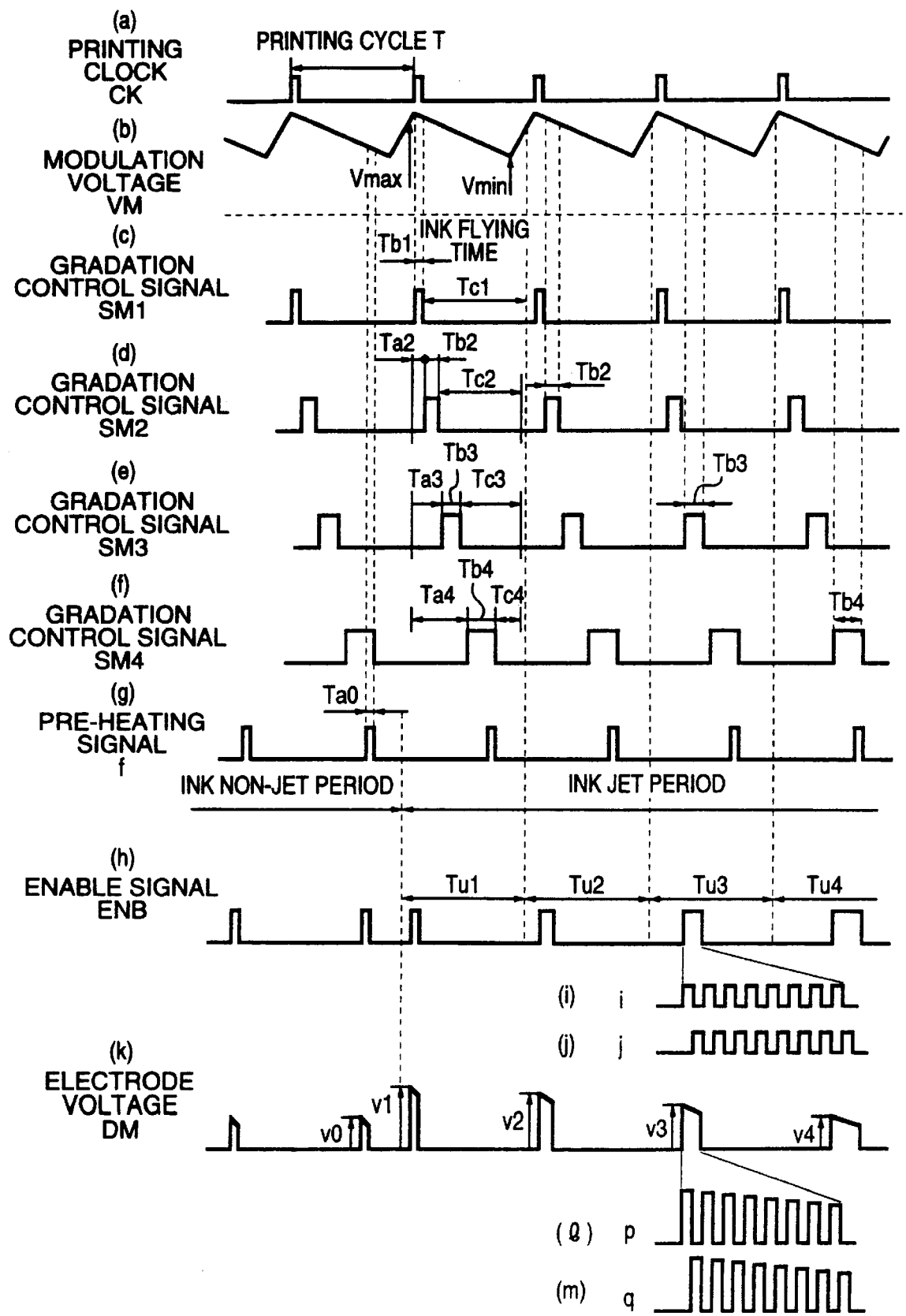

The signals and the operation of the gradation record control apparatus shown in FIG. 1 relating to the present invention will be explained next. FIG. 6 is a timing chart for explaining the operation of the gradation record control apparatus shown in FIG. 1, and this shows a case of four gradations as one example. To be more specific, this timing chart shows the case where there are four kinds of dot diameter. The four kinds of dot diameter are expressed by small, small-medium, medium-large and large in the order from a small size. FIG. 6(*a*) shows a character print clock CK, FIG. 6(*b*) shows a modulation voltage VM, FIG. 6(*c*) shows a gradation control signal SM1 in the case of recording a small dot diameter, FIG. 6(*d*) shows a gradation control signal SM2 in the case of recording a small-medium dot diameter, FIG. 6(*e*) shows a gradation control signal SM3 in the case of recording a medium-large dot diameter, FIG. 6(*f*) shows a gradation control signal SM4 in the case of recording a large dot diameter, FIG. 6(*g*) shows a pre-heating signal $\underline{f}$, FIG. 6(*h*) shows an enable signal ENB, FIGS. 6(*i*) and (*j*) show pulse signals $\underline{i}$ and $\underline{j}$ respectively in the driver circuits 6 to 9 (reference FIG. 2), FIG. 6(*k*) shows a voltage between the electrodes DM, and FIGS. 6(*l*) and (*m*) show drive signals $\underline{p}$ and $\underline{q}$ respectively to be outputted from the driver circuits 6 to 9 (reference FIGS. 1 and 2).

Referring to FIG. 6(*a*), the print clock CK represents a printing cycle (jet cycle) T, which is a clock that becomes the basis for the printing timing of each nozzle 5. The print clock CK is inputted to the power source circuit 10, the heat pulse generators 15 to 18 and the pre-heat pulse generator 19, and the respective power source circuit 10, the heat pulse generators 15 to 18 and the pre-heat pulse generator 19 operate in synchronism with the printing cycle T. Referring to FIG. 6(*b*), the modulation voltage VM is a triangular wave of the cycle T which is synchronous with the print clock CK and takes values of a maximum voltage Vmax and a minimum voltage Vmin. This modulation voltage VM is commonly supplied to the driver circuits 6 to 9. The modulation voltage VM may take a sawtooth waveform, a sinusoidal waveform or a staircase waveform so long as the modulation voltage VM has a periodicity. Referring to FIGS. 6(*c*), (*d*), (*e*) and (*f*), the modulation control signals SM1, SM2, SM3 and SM4 are the signals which are outputted from the heat pulse generators 15, 16, 17 and 18 in synchronism with the print clock CK respectively and which vary the jet quantity of the conductive ink or the recording dot diameter. These gradation control signals are the timing signals which correspond to the small, small-medium, medium-large and large that show the sizes of the recording dot diameters. Referring to FIG. 6(*g*), the pre-heating signal $\underline{f}$ is a signal for carrying out the pre-heating which does not lead to a jetting of the conductive ink during a non-jet period of the conductive ink (including the case where the conductive ink is not jetted during a jet period of the conductive ink), and this pre-heating signal $\underline{f}$ is outputted from the pre-heat pulse generator 19 in synchronism with the print clock CK. Referring to FIG. 6 (*h*), the enable signal ENB is a signal to be outputted from the multiplexers 11 to 14, and this is a signal to be selected by the selecting signal SEL to the gradation level out of the gradation control signals SM1, SM2, SM3 and SM4 and the pre-heating signal $\underline{f}$ in each printing cycle.

Next, the operation of the gradation record control apparatus shown in FIG. 1 will be explained for the multiplexer 11 and the driver circuit 6. Assume that, in the multiplexer 11, the pre-heating signal $\underline{f}$ is selected by the selecting signal SEL during a non-jet period of the conductive ink, and the gradation control signal SM1 is selected during a gradation control period Tu1, the gradation control signal SM2 is selected during a gradation control period Tu2, the gradation control signal SM3 is selected during a gradation control period Tu3 and the gradation control signal SM4 is selected during a gradation control period Tu4, by the selecting signal SEL during a jet period of the conductive ink respectively. The pulse signals $\underline{i}$ and $\underline{j}$ shown in FIGS. 6 (*i*) and (*j*), that is, the continuous basic pulse signals $\underline{c}$ and $\underline{d}$ (reference FIG. 2), are the AC pulse signals of which phases are deviated by 180 degrees from each other, and these AC pulse signals heat the conductive ink during the non-jet period of the conductive ink and during the jet period of the conductive ink. The electrode voltage DM of the head drive signal that is the electrode voltage signal is shown in FIG. 6(k) in a DC for simplicity to represent the AC voltage signals p and q of which phases are deviated by 180 degrees from each other (reference FIG. 2 and FIGS. 6(l) and (m)) and which are applied to the electrodes 3 and 4. During the non-jet period of the conductive ink, the electrode voltage DM of the head drive signal to be outputted from the driver circuit 6 is a signal that is kept on during the period of Ta0 by the pre-heating signal f when the value of the modulation voltage VM is V0, and the electrode voltage DM carries out a pre-heating during the period of Ta0. During the jet period of the conductive ink, the enable signal ENB becomes a high level during a period of Tb1 from when the value of the modulation voltage VM has become V1 when the record dot diameter is small, the enable signal ENB becomes a high level during a period of Tb2 from when the value of the modulation voltage VM has become V2 when the record dot diameter is small-medium, the enable signal ENB becomes a high level during a period of Tb3 from when the value of the modulation voltage VM has become V3 when the record dot diameter is medium-large, and the enable signal ENB becomes a high level during a period of Tb4 from when the value of the modulation voltage VM has become V4 when the record dot diameter is large. In the manner as described above, the electrode voltage DM of the head drive signal is obtained by taking out from the modulation voltage VM a voltage value and a current conduction time at which the enable signal ENB matches the dot diameter.

Similar to the multiplexer 11, the multiplexers 12, 13 and 14 receive the selecting signal SEL which is own to each nozzle 5 and output the enable signal ENB to the driver circuits 7, 8 and 9 respectively. In this way, it is possible to jet the conductive ink of the quantity corresponding to the record dot diameter from each nozzle 5. FIG. 1 shows the state that ink droplets IP1, IP2, IP3 and IP4 corresponding to the record dot diameters of small, small-medium, medium-large and large are being jetted from the four nozzles 5 of the printing head 1 respectively.

In the gradation record control apparatus as described above, when the printing is to be carried out while the printing head 1 is making a relative movement with respect to the printing sheet, it is necessary to make an adjustment that the conductive ink droplets are shot to the same point on the printing sheet even if the sizes of the droplets are different. In general, when a smaller droplet is jetted from the nozzle 5, the flying speed of the conductive ink becomes smaller since the energy to be used for this purpose is smaller. In FIG. 6, the ink flying time when the gradation control signal SM1 or the record dot diameter is small is set as Tc1, the ink flying time when the gradation control signal SM2 or the record dot diameter is small-medium is set as Tc2, the ink flying time when the gradation control signal SM3 or the record dot diameter is medium-large is set as Tc3, and the ink flying time when the gradation control signal SM4 or the record dot diameter is large is set as Tc4. The timings when the gradation control signals SM2, SM3 and SM4 become high are after the periods of Ta2, Ta3 and Ta4 with respect to the gradation control signal SM1 respectively, and the values of the gradation voltage VM in this case become V2, V3 and V4. The gradation control signals SM2, SM3 and SM4 become high during the periods of Tb2, Tb3 and Tb4 respectively.

As is clear from FIG. 6, the arrival points of the conductive ink droplets on the printing sheet become the same even if the jetted quantity of the conductive ink changes (or even if the flying time of the conductive ink changes) when the modulation voltage VM is generated as follows:

$$Tb1 + Tc1 = Ta2 + Tb2 + Tc2 \quad (1)$$

$$= Ta3 + Tb3 + Tc3$$

$$= Ta4 + Tb4 + Tc4$$

The modulation voltages are obtained as follows from the result of a measuring of the record when the voltages have been simply changed in actual.

TABLE 1

| Dot diameter | Voltage | Tb | Dot diameter | Ink speed | Tc |
|---|---|---|---|---|---|
| Small | (V1) 30.0 V | (Tb1) 9 µs | 63 µm | 8 m/s | (Tc1) 188 µs |
| Small-medium | (V2) 25.0 V | (Tb2) 20 µs | 82 µm | 10 m/s | (Tc2) 150 µs |
| Medium-large | (V3) 22.0 V | (Tb3) 38 µs | 106 µm | 16 m/s | (Tc3) 94 µs |
| Large | (V4) 20.5 V | (Tb4) 60 µs | 124 µm | 25 m/s | (Tc4) 60 µs |

When the droplets arrival points are corrected from Tb1+Tc1=Ta4+Tb4+Tc4 in the expression (1), the following relation is obtained from [Table 1].

$$Ta4 = Tb1 + Tc1 - Tb4 - Tc4$$

$$= 9 + 188 - 60 - 60$$

$$= 77 \; \mu s$$

Accordingly, for a voltage change from 30 V to 20.5 V, a modulation voltage is generated which has a slope of Ta4−(Tb1/2)+Tb4/2=77−9/2+60/2=102.5 µs. When it is assumed that the value of this modulation voltage changes linearly, Ta, Tb, Tc (Ta1 to Ta4, Tb1 to Tb4, Tc1 to Tc4) as shown in [Table 2] is obtained.

TABLE 2

| Dot diameter | Ta | Tb | Tc | Ta + Tb + Tc |
|---|---|---|---|---|
| Small | 0 µs | (Tb1) 9 µm | (Tc1) 188 µ/s | 197.0 µs |
| Small-medium | (Ta2) 48.5 µs | (Tb2) 20 µm | (Tc2) 150 µ/s | 218.5 µs |
| Medium-large | (Ta3) 71.5 µs | (Tb3) 38 µm | (Tc3) 94 µ/s | 203.5 µs |
| Large | (Ta4) 77.0 µs | (Tb4) 60 µm | (Tc4) 60 µ/s | 197.0 µs |

In Ta+Tb+Tc in [Table 2], there is a 10% difference in the droplets arrival points between the small and the small-medium of the recording dot diameter. However, this deviation of the droplets arrival points becomes smaller when a correction voltage for correcting the modulation voltage VM is added to have time characteristics of an optimum modulation voltage. Further, when the maximum value Vmax and the minimum value Vmin of the modulation voltage VM are selected at voltage values which are optimum at the temperatures of the environmental temperature and the conductive ink temperature, it is possible to eliminate an influence to the temperature of the gradation recording.

In the above-described embodiment, a case where there are four nozzles is shown. However, in the present invention, the number of the nozzles is not limited to this number, and it is also possible to increase the number of the nozzles by increasing the number of multi-plexers and driver circuits. Further, in the above-described embodiment, a case where there are four gradations is shown. However, it is also possible to increase the number of the gradations by increasing the number of heat pulse generators.

As described above, according to the present embodiment, the gradation control signal is selected at each printing cycle in the multiplexers 11 to 14, and the printing head 1 is driven by the head drive signal of a value and a phase according to the selected gradation control signal. Therefore, it is possible to carry out a high-speed changing over of the gradations. Further, for changing over the gradations, a switch change-over for each gradation as required in the conventional system is not necessary, but a high-speed gradation printing can be achieved in a small-scale circuit. Further, since the head drive signal has a phase according to the gradation, it is possible to correct the ink flying time, or the arrival points of the ink droplets, which is different depending on the gradation. Moreover, since a pre-heating is carried out during an ink non-jet period, it is possible to keep the conductive ink at a constant temperature and it is also possible to prevent an inability of the gradation printing because of a reduction in the temperature.

As described above, the present invention includes a plurality of nozzles for jetting ink, an ink jet energy generating unit, provided for each of the plurality of nozzles, for generating an energy to jet ink of different quantity from the corresponding nozzle according to a voltage value to be inputted, a gradation voltage generating unit for generating a gradation voltage of which voltage value changes at a predetermined cycle, and an output unit for outputting a part of the gradation voltage to the ink jet energy generating unit according to the quantity of the ink jetted. With the above-described structure, it is possible to output different voltages to the ink jet energy generating units and to change the quantity of ink jet from each nozzle, without providing a plurality of voltage sources and a plurality of switching elements, and it is also possible to increase the printing speed even if the number of the gradation increases in a small circuit scale.

Further, since the cycle and the voltage value of the modulation voltage to be generated from the modulation voltage generating unit is determined according to the relation between the quantity of the ink jetted from the nozzle and the ink jet speed, it is possible to correct the difference in the ink jetting speed which is different depending on the value of the voltage supplied to the ink jet energy generating unit, and thus it is possible to prevent a deviation of the ink droplets arrival points on the recording sheet depending on the gradation.

Further, since the maximum value and the minimum value of the gradation voltage are changed according to the environmental temperature and the ink temperature, it is possible to prevent the temperature from affecting the gradation.

What is claimed is:

1. A gradation record control apparatus for an ink jet printer, said gradation record control apparatus comprising:
    a plurality of nozzles;
    ink jet energy generating means, provided for each of said plurality of nozzles, for generating an energy to jet ink of different quantities from said plurality of nozzles according to a voltage value to be inputted,
    modulation voltage generating means for generating a modulation voltage having a value which changes at a predetermined cycle that is equal to a printing cycle which determines a printing timing of each of said nozzles, and
    output means for outputting a variable part of said predetermined cycle of said modulation voltage to said ink jet energy generating means as said voltage value to control a quantity of said ink to be jetted.

2. A gradation record control apparatus for an ink jet printer, according to claim 1, wherein said ink jet energy generating means generates a thermal energy.

3. A gradation record control apparatus for an ink jet printer, according to claim 1, wherein said ink is a conductive ink and said ink jet energy generating means flows a current to said conductive ink.

4. A gradation record control apparatus for an ink jet printer, according to claim 1, wherein said modulation voltage generating means changes a maximum value and a minimum value of said modulation voltage according to an environmental temperature.

5. A gradation record control apparatus for an ink jet printer, according to claim 1, wherein said modulation voltage generating means changes a maximum value and a minimum value of said modulation voltage according to a temperature of said ink.

6. A gradation record control apparatus for an ink jet printer, according to claim 1, wherein said modulation voltage is periodic, with a period equal to said predetermined cycle.

7. A gradation record control apparatus for an ink jet printer, according to claim 1, wherein said modulation voltage generating means generates said modulation voltage which is lower at an end of said predetermined cycle than at a beginning of said predetermined cycle.

8. A gradation record control apparatus for an ink jet printer, according to claim 1, wherein said modulation voltage generating means determines said predetermined cycle and a voltage value of said modulation voltage according to a relationship between said quantity and a flying speed of said ink to be jetted from said nozzles.

9. A gradation record control apparatus for an ink jet printer, said gradation record control apparatus comprising:
    a plurality of nozzles;
    ink jet energy generating means, provided for each of said plurality of nozzles, for generating an energy to jet ink of different quantities from said plurality of nozzles according to a voltage value to be inputted,
    modulation voltage generating means for generating a modulation voltage having a value which changes at a predetermined cycle that is equal to a printing cycle which determines a printing timing of each of said nozzles,
    control signal generating means for outputting to selecting means, at said predetermined cycle, control signals of different phases according to a quantity of ink to be jetted, said selecting means for, responsive to said control signals, selecting a variable part of said predetermined cycle of said modulation voltage, and
    output means for outputting said variable part of said predetermined cycle of said modulation voltage to said ink jet energy generating means as said voltage value.

10. A gradation record control apparatus for an ink jet printer, according to claim 9, wherein said ink jet energy generating means generates a thermal energy.

11. A gradation record control apparatus for an ink jet printer, according to claim 9, wherein said ink is a conductive ink and said ink jet energy generating means flows a current to said conductive ink.

12. A gradation record control apparatus for an ink jet printer, according to claim 9, wherein said modulation voltage generating means changes a maximum value and a minimum value of said modulation voltage according to an environmental temperature.

13. A gradation record control apparatus for an ink jet printer, according to claim 9, wherein said modulation voltage generating means changes a maximum value and a minimum value of said modulation voltage according to a temperature of said ink.

14. A gradation record control apparatus for an ink jet printer, according to claim 9, wherein said modulation voltage generating means generates said modulation voltage which is lower at an end of said predetermined cycle than at a beginning of said predetermined cycle.

15. A gradation record control apparatus for an ink jet printer, according to claim 9, wherein said modulation voltage generating means determines said predetermined cycle and a voltage value of said modulation voltage according to a relationship between said quantity and a flying speed of said ink to be jetted from said nozzles.

16. A gradation record control apparatus for an ink jet printer, according to claim 9, wherein said modulation voltage is periodic, with a period equal to said predetermined cycle.

* * * * *